US009522360B2

(12) United States Patent
Schmidt et al.

(10) Patent No.: US 9,522,360 B2
(45) Date of Patent: Dec. 20, 2016

(54) THREE-WAY-CATALYST SYSTEM

(71) Applicant: Umicore AG & CO. KG, Hanau-Wolfgang (DE)

(72) Inventors: Marcus Schmidt, Ginsheim (DE); Joel Despres, Rodenbach (DE); Martin Roesch, Rodgau (DE); Raoul Klingmann, Alzenau (DE); Joerg-Michael Richter, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/405,778

(22) PCT Filed: Jun. 5, 2013

(86) PCT No.: PCT/EP2013/001645
§ 371 (c)(1),
(2) Date: Dec. 4, 2014

(87) PCT Pub. No.: WO2013/182303
PCT Pub. Date: Dec. 12, 2013

(65) Prior Publication Data
US 2015/0125371 A1  May 7, 2015

Related U.S. Application Data

(60) Provisional application No. 61/690,513, filed on Jun. 28, 2012.

(30) Foreign Application Priority Data

Jun. 6, 2012 (EP) .................................... 12171017

(51) Int. Cl.
| | |
|---|---|
| B01D 50/00 | (2006.01) |
| B01D 53/56 | (2006.01) |
| B01D 53/94 | (2006.01) |
| B01J 8/02 | (2006.01) |
| B01J 23/00 | (2006.01) |
| B01J 23/02 | (2006.01) |
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 21/04 | (2006.01) |
| B01J 37/02 | (2006.01) |
| B01J 35/00 | (2006.01) |
| B01J 23/63 | (2006.01) |
| B01J 35/04 | (2006.01) |
| F01N 3/10 | (2006.01) |
| F01N 3/08 | (2006.01) |
| F01N 13/00 | (2010.01) |

(52) U.S. Cl.
CPC ......... *B01D 53/945* (2013.01); *B01D 53/9454* (2013.01); *B01D 53/9477* (2013.01); *B01J 23/63* (2013.01); *B01J 35/0006* (2013.01); *B01J 35/04* (2013.01); *B01J 37/0244* (2013.01); *F01N 3/0864* (2013.01); *F01N 3/101* (2013.01); *F01N 13/0093* (2014.06); *B01D 2255/1021* (2013.01); *B01D 2255/1023* (2013.01); *B01D 2255/1025* (2013.01); *B01D 2255/2068* (2013.01); *B01D 2255/2092* (2013.01); *B01D 2255/20715* (2013.01); *B01D 2255/407* (2013.01); *B01D 2255/9022* (2013.01); *B01D 2257/404* (2013.01); *B01D 2257/502* (2013.01); *B01D 2257/702* (2013.01); *B01D 2258/014* (2013.01); *B01J 35/0073* (2013.01); *F01N 2510/0684* (2013.01); *Y02T 10/22* (2013.01)

(58) Field of Classification Search
CPC ............ B01J 23/10; B01J 23/42; B01J 23/44; B01J 23/46; B01J 23/56; B01J 23/63; B01J 21/04; B01D 53/945
USPC ....... 502/302–304, 327, 332, 333, 334, 339, 502/349, 355, 439, 527.12, 527.13, 502/527.19; 423/213.5; 422/171
See application file for complete search history.

(56) References Cited

U.S. PATENT DOCUMENTS

| | | | |
|---|---|---|---|
| 5,597,771 A | 1/1997 | Hu et al. | |
| 6,044,644 A | 4/2000 | Hu et al. | |

(Continued)

FOREIGN PATENT DOCUMENTS

| | | |
|---|---|---|
| CN | 1205652 A | 1/1999 |
| CN | 101479023 A | 7/2009 |

(Continued)

OTHER PUBLICATIONS

Search Report for Chinese Patent Application No. 201380027762.4 (2 pages).

(Continued)

*Primary Examiner* — Cam N. Nguyen
(74) *Attorney, Agent, or Firm* — Smith, Gambrell & Russell, LLP

(57) ABSTRACT

The present invention describes a three-way-catalyst system comprising a first three-way catalyst on an inert catalyst support which is a double-layer catalyst comprising a first layer on the inert catalyst support, comprising active alumina, a cerium/zirconium mixed oxide and palladium and a second layer applied to the first layer and in direct contact with the exhaust gas to be purified, comprising active alumina and rhodium and being free of cerium and cerium containing materials and a second three-way-catalyst located upstream of the first three-way catalyst.

20 Claims, No Drawings

(56) References Cited

U.S. PATENT DOCUMENTS

| | | | |
|---|---|---|---|
| 6,103,660 A | 8/2000 | Yperen et al. | |
| 6,254,842 B1 | 7/2001 | Hu et al. | |
| 6,497,851 B1 | 12/2002 | Hu et al. | |
| 6,764,665 B2* | 7/2004 | Deeba | B01D 53/865 423/213.5 |
| 7,517,510 B2* | 4/2009 | Chen | B01D 53/945 422/168 |
| 7,550,124 B2* | 6/2009 | Chen | B01D 53/945 422/168 |
| 7,622,096 B2 | 11/2009 | Deeba et al. | |
| 7,754,171 B2* | 7/2010 | Chen | B01D 53/945 423/213.2 |
| 7,758,834 B2* | 7/2010 | Chen | B01D 53/945 423/213.2 |
| 7,795,172 B2* | 9/2010 | Foong | B01D 53/945 502/302 |
| 7,879,755 B2* | 2/2011 | Wassermann | B01D 53/945 423/213.5 |
| 8,038,951 B2* | 10/2011 | Wassermann | B01J 21/066 422/168 |
| 8,057,745 B2* | 11/2011 | Toyoda | B01D 53/945 422/171 |
| 8,066,963 B2* | 11/2011 | Klingmann | B01D 53/944 423/212 |
| 8,227,374 B2* | 7/2012 | Sato | B01D 53/945 502/100 |
| 8,323,599 B2* | 12/2012 | Nunan | B01D 53/945 423/213.2 |
| 8,394,348 B1* | 3/2013 | Nunan | B01D 53/945 423/213.2 |
| 8,557,204 B2* | 10/2013 | Nunan | B01D 53/945 422/177 |
| 8,568,675 B2* | 10/2013 | Deeba | B01D 53/945 422/177 |
| 8,617,496 B2* | 12/2013 | Wei | B01J 23/63 423/213.2 |
| 8,640,440 B2* | 2/2014 | Klingmann | B01D 53/944 422/170 |
| 8,828,343 B2* | 9/2014 | Liu | B01D 53/945 423/213.5 |
| 8,833,064 B2* | 9/2014 | Galligan | B01D 53/945 423/213.5 |
| 8,968,690 B2* | 3/2015 | Nunan | B01D 53/945 422/177 |
| 2003/0061860 A1 | 4/2003 | Hu et al. | |
| 2003/0099583 A1 | 5/2003 | Ikeda et al. | |
| 2009/0193796 A1 | 8/2009 | Wei et al. | |
| 2010/0135879 A1 | 6/2010 | Roesch et al. | |
| 2010/0263357 A1 | 10/2010 | Lindner et al. | |
| 2010/0275579 A1 | 11/2010 | Klingmann et al. | |
| 2010/0293930 A1 | 11/2010 | Li et al. | |
| 2011/0030346 A1 | 2/2011 | Neubauer et al. | |
| 2011/0041486 A1 | 2/2011 | Kato et al. | |
| 2011/0072794 A1 | 3/2011 | Van Nieuwstadt et al. | |
| 2011/0120090 A1 | 5/2011 | Sorensen, Jr. | |
| 2011/0126527 A1 | 6/2011 | Hilgendorff | |
| 2015/0125370 A1 | 5/2015 | Klingmann et al. | |

FOREIGN PATENT DOCUMENTS

| | | |
|---|---|---|
| CN | 101528347 A | 9/2009 |
| CN | 102112211 A | 6/2011 |
| DE | 102009056681 | 7/2010 |
| EP | 957064 | 11/1999 |
| EP | 1 974 809 | 10/2008 |
| EP | 2 038 046 | 3/2009 |
| EP | 2 042 225 | 4/2009 |
| EP | 2 308 592 | 4/2011 |
| EP | 2 318 673 | 5/2011 |
| WO | 95/00235 | 1/1995 |
| WO | 97/23278 A1 | 7/1997 |
| WO | 2008/000449 A2 | 1/2008 |
| WO | 2008/113445 A1 | 9/2008 |
| WO | 2009/043390 | 4/2009 |
| WO | 2009/100097 | 8/2009 |
| WO | 2010/012677 | 2/2010 |
| WO | 2011/015615 | 2/2011 |
| WO | 2012029051 A1 | 3/2012 |

OTHER PUBLICATIONS

International Search Report for PCT/EP2013/001645 Dated Dec. 12, 2013 (4 pages).
Written Opinion of the International Searching Authority for PCT/EP2013/001645 dated Dec. 6, 2014 (7 Pages).
International Preliminary Report on Patentability for PCT/EP2013/001645 dated Dec. 6, 2014 (8 pages).

* cited by examiner

THREE-WAY-CATALYST SYSTEM

The present invention describes a three-way-catalyst system for use in the purification of exhaust gases from gasoline engines.

It is well known in the field of combustion engines that fuel combustion is not complete and yield emissions of pollutants like unburned hydrocarbons (HC), carbon monoxide (CO), nitrogen oxides ($NO_x$) and particulate matter (PM). In order to improve air quality, emission limits legislations are in place to achieve lower emissions of pollutants from stationary applications and from mobile sources. For mobile sources like passenger cars, primary measures enabled achieving decrease in the emission of pollutants. Improvement of fuel-air mixing as primary measure yielded considerable diminution of pollutants. However, due to more stringent legislations over the years, the use of heterogeneous catalysts has been made inevitable.

For gasoline engines, the so-called three-way catalyst (TWC) enables the elimination of HC, CO and $NO_x$. Optimal use of the TWC is around Lambda=1+/−0.005 where the air/fuel ratio is equal to 14.56. Above these values, the exhaust gas is said lean, and CO and HC are catalytically oxidized to carbon dioxide and water. Below this value, the exhaust gas is said rich and mainly NO are reduced to nitrogen $N_2$ using e.g. CO as reducing agent.

Optimal conversion of HC, CO and NO is achieved at Lambda=1. However, gasoline engines operate under oscillating conditions between slightly lean and slightly rich conditions. Under purely rich conditions, the conversion of hydrocarbon drops rapidly. In order to broaden the optimal operation of a TWC, oxygen storage material (OSM) in the form of Ce-mixed oxides were included in the formulation of the TWC.

For such Lambda=1 operating gasoline engines there is a variety of solutions regarding the conducted exhaust systems concerning the number of included catalyst and their position related to engine outlet. Common single brick solutions in a close coupled engine out position use different substrates, volumes and precious metal loadings, as well as homogenous or zoned catalyst types. Moreover, the installed catalysts in case of an exhaust system with minimum two bricks or more differentiate e.g. in their individual volume, type of substrate of each brick, precious metal loading and type of coating, like homogenously coated or zoned catalysts. This variety of individual exhaust systems has a common functional interface, given by the lambda control of the engine. The interaction of the lambda control and the individual catalyst system needs to be optimized to achieve the best emission performance of the exhaust system. An important role for the close loop control behavior of the catalyst system plays the selected catalyst formulation. For a given lambda control strategy, it is obvious, that preferred, an aligned catalyst formulation could work best together with the control algorithm. On the other hand, modern engine management systems offer a broad range of software functions, which allow the adjustment of the lambda control behavior in a meaningful way, to get the best response from the catalyst system in terms of good emission performance. To equalize this area of conflict for optimization, it is useful to develop catalyst formulations and systems, which can address this problem in a way that the application complexity can be reduced without compromise in emission performance, or even generating improvements. The catalyst system of this invention provides a solution for this trade off.

WO 2008/000449 A2 describes a conventional double layered three-way catalyst. In this invention, the first layer contains an active aluminum oxide and a first Ce/Zr mixed oxide, both being activated with palladium. The second layer contains an active aluminum oxide and a second Ce/Zr mixed oxide, both activated with rhodium. The specificity of the invention is that the ratio Ce/Zr of the first mixed oxide is higher than the ratio Ce/Zr of the second mixed oxide.

WO 2008/113445 A1 also discloses a double layered three-way catalyst wherein both layers comprise active alumina, Ce/Zr mixed oxide and palladium. The layers differ in that the second layer comprises rhodium in addition to platinum and in that the ratio Ce/Zr of the first layer mixed oxide is higher than the ratio Ce/Zr of the second layer mixed oxide. U.S. Pat. No. 6,044,644 and U.S. Pat. No. 6,254,842 disclose a close-coupled catalyst which has been designed to reduce hydrocarbon emissions from gasoline engines during cold starts. It comprises components of the type used in a TWC catalyst composition except that there is substantially no cerium oxide and praseodymium oxide.

The present invention provides a three-way-catalyst system comprising
  a first three-way catalyst on an inert catalyst support which is a double-layer catalyst comprising
    a first layer on the inert catalyst support, comprising active alumina, a cerium/zirconium mixed oxide and palladium as a catalytically active noble metal and
    a second layer applied to the first layer and in direct contact with the exhaust gas to be purified, comprising active alumina and rhodium as a catalytically active noble metal, wherein the second layer is free of cerium and cerium containing materials and does not contain any catalytically active noble metals besides rhodium, and
  a second three-way-catalyst.

The first layer of the first three-way catalyst may comprise platinum and/or rhodium as additional catalytically active noble metals besides palladium.

In a preferred embodiment of the present invention platinum is present in the first layer besides palladium.

In a further preferred embodiment of the present invention the first layer does not contain any catalytically active noble metal besides palladium.

The catalytically active noble metals of the first three-way catalyst are used in amounts that are selected in view of the specific operation requirements and depend on the desired pollutant conversions. Typically, palladium is used in amounts of 0.1 to 15 g/L based on the volume of the inert catalyst support. The concentration of rhodium is typically from 0.01 to 1 g/L, based on the volume of the inert catalyst support. If platinum is present in the first layer of the first three-way catalyst the amounts typically used are from 0.01 to 1 g/L, based on the volume of the inert catalyst support.

The catalytically active noble metals are deposited on one or more of the other components of the catalyst. For example, the catalytically active noble metal of the first layer can be deposited on the active alumina or on the cerium/zirconium mixed oxide or on both.

The active aluminum oxide of the first and second layers is usually stabilized by doping with 1 to 10%, preferably 3 to 6% and more preferably 3.5 to 4.5%, by weight of lanthanum oxide, based on the total weight of the aluminum oxide.

The cerium/zirconium mixed oxide used in the first layer of the first three-way catalyst is characterized by a weight ratio of cerium oxide to zirconium oxide. Such weight ratio can vary within broad limits and depend on the specific technical task the catalyst is supposed to solve. Typically the weight ratio of cerium oxide to zirconium oxide is from 0.1 to 1.2 and preferably from 0.8 to 1.2.

The cerium/zirconium mixed oxide is preferably used in amounts of 40 to 60 g/L, based on the volume of the inert catalyst support.

For the purposes of the present invention the term "free of cerium and cerium containing materials" means that the second layer of the first three-way catalyst doesn't contain significant amounts of cerium or cerium containing materials. However, this term doesn't mean that the second layer of the inventive catalyst may not contain small amounts of cerium or cerium containing materials which may be present in form of impurities or which may have migrated from the first into the second layer.

In a preferred embodiment of the present invention the second layer of the first three-way catalyst comprises a neodymium/zirconium mixed oxide.

The weight ratio of neodymium oxide to zirconium oxide in such mixed oxides is preferably from 0.2 to 0.5.

The neodymium/zirconium mixed oxide is preferably used in amounts of 50 to 80 g/L, based on the volume of the inert catalyst support.

In case a neodymium/zirconium mixed oxide is present in the second layer of the first three-way catalyst rhodium can be deposited on the active alumina or on the neodymium/zirconium mixed oxide or on both. Preferably, the rhodium is deposited on both, the active alumina and the neodymium/zirconium mixed oxide.

In a further embodiment of the present invention, in the first three-way catalyst the second layer completely covers the first layer. In this case, the first layer is not in direct contact with the exhaust gas to be purified.

In an additional embodiment of the present invention, the first three-way catalyst of the inventive three-way-catalyst system comprises an intermediate layer between the inert catalyst support and the first layer.

Typically, said intermediate layer comprises active alumina and is free of platinum group metals. The intermediate layer is preferably used in amounts of 40 to 80 g/L, based on the volume of the inert catalyst support.

The second three-way catalyst of the inventive three-way-catalyst system is usually a conventional three-way catalyst according to prior art. Suitable examples are described for example in WO2008/000449 A2 and WO2008/113445 A1.

Accordingly, the second three-way catalyst preferably comprises one or more platinum group metals, such as platinum, palladium and rhodium on a high surface area, refractory oxide support. A preferred high surface area, refractory oxide support is high surface area alumina which is particularly preferably stabilized by the addition of 1 to 10%, preferably 3 to 6% and more preferably 3.5 to 4.5%, by weight of lanthanum oxide, based on the total weight of the alumina.

In addition, the second three-way catalyst preferably comprises one or more oxygen storage components. Preferred oxygen storage components are praseodymium oxide, cerium oxide and cerium oxide containing materials, like Ce/Zr mixed oxides.

Like the first three-way catalyst, the second three-way catalyst is preferably supported on an inert catalyst support. It can be present on said support in form of one layer which contains all components mentioned above or in form of two or even more layers which differ from one another as regards platinum group metals and/or oxygen storage components.

In a particularly preferred embodiment of the present invention the first three-way catalyst is different from the second three-way catalyst.

Preferred inert catalyst supports for the first and second three-way catalyst are monoliths of ceramic or metal with a volume V, which have parallel flow channels for the exhaust gases of the internal combustion engine. The wall surfaces of the flow channels are coated with the three-way catalysts according to the present invention. Preferably, the inert catalyst support is a flow-through monolith having a honeycomb-structure.

In one embodiment of the present invention the first three-way catalyst and the second three-way catalyst are supported on different inert catalyst supports. With other words first three-way catalyst and second three-way catalyst are supported on different bricks.

In a further embodiment of the present invention the first three-way catalyst and the second three-way catalyst are supported on the same inert catalyst support. With other words first three-way catalyst and second three-way catalyst form a so-called zoned catalyst wherein the first three-way catalyst is located on the downstream side of the support and the second three-way catalyst is located on the upstream side of the support.

The inventive three-way-catalyst system can be manufactured by known methods. As regards the first three-way catalyst, the layers are preferably coated onto the support by means of a wash-coating process. Accordingly, the solids intended for a particular layer are suspended in water. In case of the first layer, these are active aluminum oxide and a cerium/zirconium mixed oxide. Palladium and optionally platinum and/or rhodium are deposited onto these materials proceeding from noble metal salts soluble in water. In case of palladium it is preferred to use palladium nitrate in the process described in U.S. Pat. No. 6,103,660, using barium hydroxide or strontium hydroxide as the base. The suspension thus obtained can immediately be used to coat the catalyst support. The layer applied is subsequently dried and optionally calcined.

The use of barium hydroxide or strontium hydroxide as the base for the precipitation of palladium nitrate leads, after final calcination, to barium oxide or strontium oxide remaining, having been deposited on the surface of the active aluminum oxide and of the cerium/zirconium mixed oxide.

In case a mixture of catalytically active noble metals is used in the first layer of the first three-way catalyst, it is possible to accomplish the deposition of all metals of the mixture simultaneously in one operation or successively in different operations.

Thereafter, the second coating is applied. To this end, active aluminum oxide and optionally neodymium/zirconium mixed oxide are suspended in water, and rhodium is deposited thereon. This can be achieved by supplying rhodium nitrate. Finally, the support carrying the first and second layer is dried and calcined and is then ready for use.

Alternatively to the procedure described, the catalytically active noble metals can also be deposited separately on any solid component of the catalyst. Only thereafter are, for example, palladium-activated aluminum oxide and palladium-activated cerium/zirconium mixed oxide suspended together in water and applied to the catalyst support. Such a procedure enables the concentration of the catalytically active noble metals on aluminum oxide on the one hand, and for example cerium/zirconium mixed oxide or neodymium/zirconium mixed oxide on the other hand, to be established in a controlled manner. For the separate deposition of the noble metals onto aluminum oxide and zirconium mixed oxides, preference is given to using the process described in EP 957064.

In case the inventive three-way-catalyst system comprises two bricks, the coated support thus obtained is combined with a second brick which carries the second three-way catalyst and which preferably has been manufactured by a wash-coating process as well.

In case the inventive three-way-catalyst system comprises one brick only, the first three-way catalyst is applied to the support by a wash-coating method as described above with the difference, however, that it is applied only to a part of its total length. Actually, it is applied starting from one end of the support (which will be the downstream end once the support will be in use) until a given length which is less than the total length of the support. The second three-way catalyst will be similarly applied, however starting from the other end of the support (which will be the upstream side once the support will be in use) and also ending at a given length which is less than the total length of the support.

If the total length of the support is L, the length of the zone comprising the first three-way catalyst is a and the length of the zone comprising the second three-way catalyst is b, preferably L=a+b.

The three-way-catalyst system of the present invention is suitable for cleaning exhaust gases of a motor vehicle equipped with a gasoline engine and can for this purpose be used in a manner known to the skilled person.

Accordingly, the present invention further provides the use of the three-way-catalyst system of the present invention for cleaning the exhaust gases of a motor vehicle equipped with a gasoline engine, wherein the second three-way catalyst is located upstream of the first three-way catalyst.

EXAMPLES

For the testing of the present invention, round cordierite substrates were used with a diameter of 101.6 mm and a length of 76.2 mm. Cell density was 600 cpsi, and the wall thickness was 4.3 mil.

Comparative Example:

Two identical double-layered three-way catalysts according to WO 2008/000449 A2 were combined to a three-way-catalyst system and used as reference sample. Each of them was prepared according to the recipe described in said publication as follows:
a) For the first layer, an aqueous suspension was prepared by mixing a lanthanum oxide stabilized aluminum oxide containing 3 wt. % $La_2O_3$ and having a specific surface area of 140 $m^2/g$, with a first Ce—Zr mixed oxide having a $ZrO_2$ content of 50% and strontium hydroxide as basic component. $Pd(NO_3)_2$ was used as noble metal precursor and was deposited on all oxides. After finalizing the suspension, the raw cordierite substrate was coated with the first layer followed by a drying step. After calcination, the composition of the first layer is:

| 80 g/L | La-stabilized aluminum oxide |
| 55 g/L | first CeZr-mixed oxide |
| 10 g/L | strontium oxide (on all components) |
| 2.72 g/L | palladium (on all components) | b) For the second layer an aqueous suspension containing lanthanum oxide stabilized aluminum oxide (3 wt. % $La_2O_3$, specific surface area=140 $m^2/g$) and a second Ce—Zr mixed oxide having a $ZrO_2$ content of 70% was prepared. A $Rh(NO_3)_2$ aqueous solution was injected into the suspension. The second layer was coated on top of the first layer. After a drying step and a calcination step, the composition of the second layer was:

| 70 g/L | La-stabilized aluminum oxide |
| 65 g/L | second CeZr-Mixed oxide |
| 0.11 g/L | Rhodium (on all components) |

Two of the coated substrates thus obtained were combined to form a system. In the test described below the resulting catalyst system is called CC1.

Example 1

In order to obtain an inventive three-way-catalyst system, the upstream substrate of CC1 was remained unchanged, whereas the downstream substrate was produced as follows:
a) The first layer in contact with the cordierite substrate was prepared exactly as described in step a) of the Comparative Example and consequently had the identical composition.
b) For the second layer an aqueous suspension was prepared comprising lanthanum oxide stabilized aluminum oxide (3 wt. % $La_2O_3$, specific surface area=140 $m^2/g$) and a Zr/Nd mixed oxide with a $ZrO_2$ content of 73%. A $Rh(NO_3)_2$ aqueous solution was injected into the suspension. The second layer was coated on top of the first layer. After a drying step and a calcination step, the composition of the second layer was:

| 66 g/L | La-stabilized aluminum oxide |
| 68 g/L | Zr/Nd mixed oxide |
| 0.11 g/L | rhodium (on all components) |

In the test described below the resulting catalyst system is called C1.

The catalysts of the Comparative Example (CC1) and Example 1 (C1) were compared after a severe fuel cut aging at an inlet temperature of 950° C. using the Federal Test Procedure (FTP) 75 test cycle at a 2l engine. The lambda control system of the engine included a wide range sensor located at the engine outlet and a jump sensor installed after both bricks of the respective catalyst system.

Both catalyst systems were compared with the same allocations at the lambda control software. The lambda control set up was the same as in the series application of the vehicle. In general, the FTP 75 test cycle comprises a much more dynamic driving behavior compared to the European NEDC emission test cycle, therefore especially the NOx emission performance of the catalyst system will be much more stressed and the quality of the interaction between lambda control and catalyst system becomes more obvious. This allows to assess the warmed up conversion efficiency of different catalyst systems better, which results in a larger differentiability between investigated systems.

The following results were obtained:
NOx:

| | | NOx Phase Comparison [g/mile] | | |
|---|---|---|---|---|
| | NOx total [g/mile] | Phase 1 Cold start phase | Phase 2 Transient phase | Phase 3 Hot start phase |
| CC1 (prior art) | 0.172 | 0.269 | 0.104 | 0.226 |
| C1 (invention) | 0.090 | 0.160 | 0.028 | 0.155 |

THC:

| | THC total [g/mile] | THC Phase Comparison [g/mile] | | |
|---|---|---|---|---|
| | | Phase 1 Cold start phase | Phase 2 Transient phase | Phase 3 Hot start phase |
| CC1 (prior art) | 0.057 | 0.115 | 0.032 | 0.059 |
| C1 (invention) | 0.048 | 0.115 | 0.019 | 0.054 |

CO:

| | CO total [g/mile] | CO Phase Comparison [g/mile] | | |
|---|---|---|---|---|
| | | Phase 1 Cold start phase | Phase 2 Transient phase | Phase 3 Hot start phase |
| CC1 (prior art) | 0.952 | 1.878 | 0.612 | 0.894 |
| C1 (invention) | 0.967 | 2.238 | 0.448 | 0.983 |

Accordingly, while CC1 and C1 perform similarly as regards THC and CO, the inventive system C1 performs outstandingly better as regards NOx.

The invention claimed is:

1. A three-way-catalyst system comprising
a first three-way catalyst on an inert catalyst support which is a double-layer catalyst comprising
a first layer on the inert catalyst support, comprising active alumina, a cerium/zirconium mixed oxide and palladium as a catalytically active noble metal and
a second layer applied to the first layer and in direct contact with the exhaust gas to be purified, comprising active alumina and rhodium as a catalytically active noble metal, wherein the second layer is free of cerium and cerium containing materials and does not contain any catalytically active noble metal besides rhodium, and
a second three-way-catalyst, wherein
the weight of cerium oxide to zirconium oxide in the cerium/zirconium mixed oxide of the first layer of the first three-way catalyst is from 0.1 to 1.2.

2. The three-way-catalyst system according to claim 1, further comprising platinum, rhodium, or mixtures thereof in the first layer of the first three-way catalyst.

3. The three-way-catalyst system according to claim 2, wherein the second three-way catalyst comprises one or more oxygen storage components.

4. The three-way-catalyst system according to claim 1, wherein the first layer of the first three-way catalyst does not contain any catalytically active noble metal besides palladium.

5. The three-way-catalyst system according to claim 4, wherein the second three-way catalyst comprises one or more oxygen storage components.

6. The three-way-catalyst system according to claim 1, wherein the second layer of the first three-way catalyst completely covers the first layer of the first three-way catalyst.

7. The three-way-catalyst system according to claim 1, wherein the inert catalyst support of the first three-way catalyst is a flow-through monolith having a honeycomb-structure.

8. The three-way-catalyst system according to claim 1, wherein the second three-way catalyst comprises one or more platinum group metals on a high surface area, refractory oxide support.

9. The three-way-catalyst system according to claim 1, wherein the second three-way catalyst comprises one or more oxygen storage components.

10. The three-way-catalyst system according to claim 1, wherein the first three-way catalyst is different from the second three-way catalyst.

11. The three-way-catalyst system according claim 1, wherein in that the first three-way catalyst and the second three-way catalyst are supported on different inert catalyst supports.

12. The three-way-catalyst system according to claim 1, wherein the first three-way catalyst and the second three-way catalyst are supported on the same inert catalyst support.

13. The three-way-catalyst system according to claim 1, wherein the second layer of the first three-way catalyst comprises a neodymium/zirconium mixed oxide.

14. A method for cleaning exhaust gas of a motor vehicle equipped with a gasoline engine, comprising contracting the exhaust gas with the three-way-catalyst system according to claim 1, and wherein the second three-way catalyst is located upstream of the first three-way catalyst.

15. A three-way-catalyst system comprising
a first three-way catalyst on an inert catalyst support which is a double-layer catalyst comprising
a first layer on the inert catalyst support, comprising active alumina, a cerium/zirconium mixed oxide and palladium as a catalytically active noble metal and
a second layer applied to the first layer and in direct contact with the exhaust gas to be purified, comprising active alumina and rhodium as a catalytically active noble metal, wherein the second layer is free of cerium and cerium containing materials and does not contain any catalytically active noble metal besides rhodium, and
a second three-way-catalyst, wherein
the second layer of the first three-way catalyst comprises a neodymium/zirconium mixed oxide.

16. The three-way-catalyst system according to claim 15, wherein the weight ratio of neodymium oxide to zirconium oxide in the neodymium/zirconium mixed oxide of the second layer of the first three-way catalyst is from 0.2 to 0.5.

17. The three-way-catalyst system according to claim 15, wherein the rhodium in the second layer of the first three-way catalyst is deposited on both, active alumina and neodymium/zirconium mixed oxide.

18. The three-way-catalyst system according to claim 15, wherein the second three-way catalyst comprises one or more oxygen storage components.

19. A three-way catalyst system comprising
a first three-way catalyst on an inert catalyst support which is a double-layer catalyst comprising
a first layer on the inert catalyst support, comprising active alumina, a cerium/zirconium mixed oxide and palladium as a catalytically active noble metal and
a second layer applied to the first layer and in direct contact with the exhaust gas to be purified, comprising active alumina and rhodium as a catalytically active noble metal, wherein the second layer is free of cerium and cerium containing materials and does not contain any catalytically active noble metal besides rhodium, and
a second three-way-catalyst, wherein
the first three-way catalyst and the second three-way catalyst are supported, either:
on different inert catalyst supports, or
on the same inert catalyst support.

20. The three-way-catalyst system according to claim 19, wherein the first three-way catalyst and the second three-way catalyst are supported on the same inert catalyst support.

* * * * *